US006172604B1

(12) United States Patent
Heillman et al.

(10) Patent No.: US 6,172,604 B1
(45) Date of Patent: Jan. 9, 2001

(54) LOW CLEARANCE ALARM BUMPER

(75) Inventors: Melvin Heillman, Shawnee; Bret Armatas, Desoto, both of KS (US)

(73) Assignee: Alvarado Manufacturing Company, Inc., Chino, CA (US)

( * ) Notice: Under 35 U.S.C. 154(b), the term of this patent shall be extended for 0 days.

(21) Appl. No.: 09/332,482

(22) Filed: Jun. 14, 1999

(51) Int. Cl.[7] .................................................. B60Q 1/22
(52) U.S. Cl. ........................ 340/463; 340/436; 340/555; 340/556; 340/689
(58) Field of Search .................................. 340/436, 463, 340/689, 686.1, 691.5, 691.1, 692, 693.5, 693.11, 693.12, 693.9, 540, 555, 556, 557, 342

(56) References Cited

U.S. PATENT DOCUMENTS

| | | | |
|---|---|---|---|
| D. 333,873 | | 3/1993 | McCue . |
| 2,738,496 | * | 3/1956 | Armstrong ............................ 340/689 |
| 2,884,623 | * | 4/1959 | Stelter ................................... 340/689 |
| 3,716,833 | * | 2/1973 | Roth ...................................... 340/436 |
| 4,916,429 | * | 4/1990 | Hicks et al. ........................... 340/436 |
| 5,011,358 | * | 4/1991 | Andersen et al. .................... 414/273 |
| 5,096,753 | | 3/1992 | McCue et al. . |
| 5,149,569 | | 9/1992 | McCue . |
| 5,343,739 | * | 9/1994 | Curry .................................... 340/436 |
| 5,390,719 | * | 2/1995 | Barnes ................................... 160/10 |
| 5,841,345 | * | 11/1998 | Bae et al. .............................. 340/575 |
| 6,002,333 | * | 12/1999 | Hickey .................................. 340/550 |

* cited by examiner

Primary Examiner—Nina Tong
(74) Attorney, Agent, or Firm—Hovey, Williams, Timmons & Collins

(57) ABSTRACT

A low clearance alarm bumper apparatus (10) includes a bumper (12) that can be suspended adjacent a doorway and below the level of the header for activating an alarm circuit (16) upon being tilted in response to an impact, such as when a forklift carrying a tall load approaches the doorway. Upon impact, the preferred bumper (12) activates a pair of lamps (36, 38) and a speaker (40 to produce an audible alarm to warn the forklift driver that the load is too tall to clear the doorway header.

2 Claims, 4 Drawing Sheets

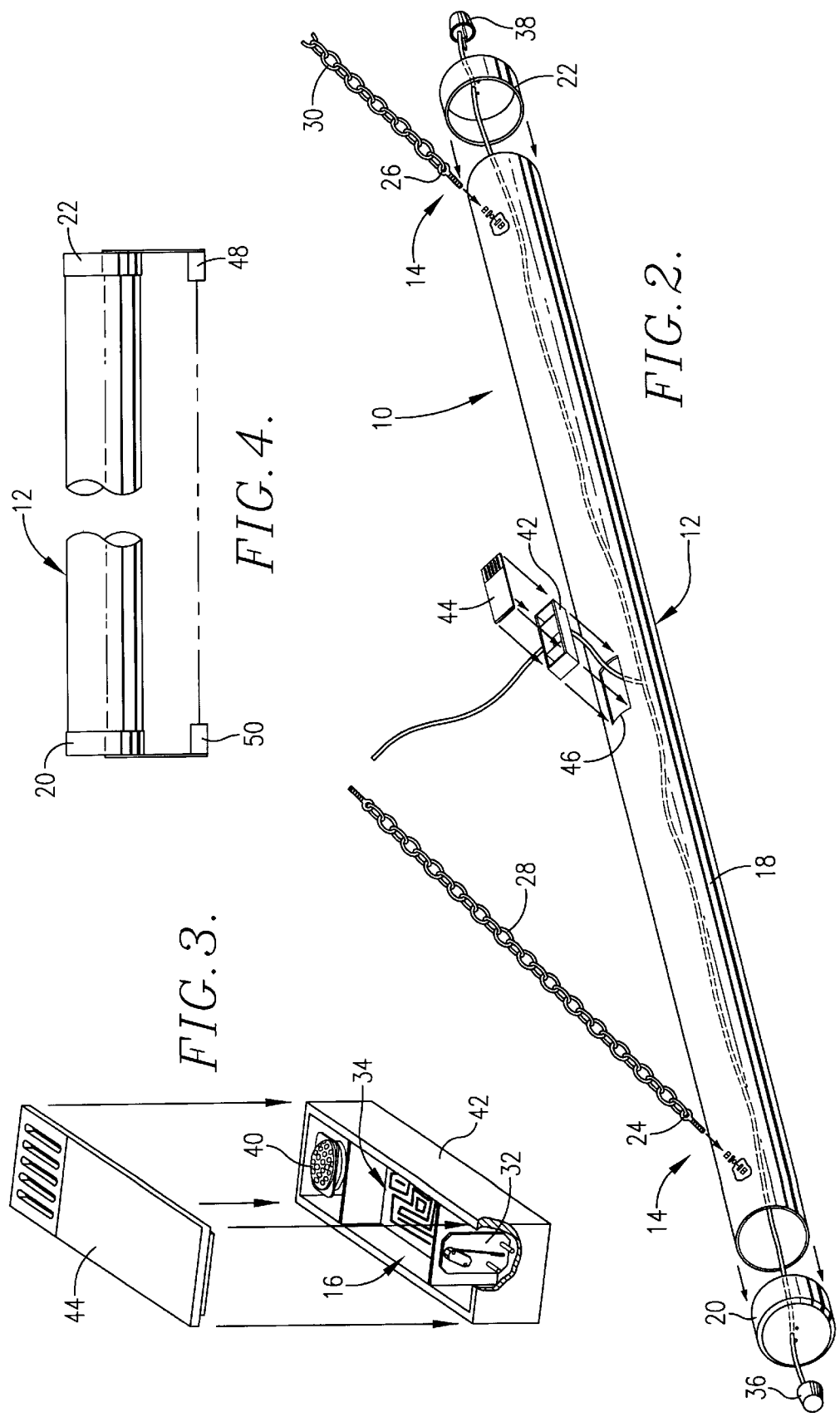

LOW CLEARANCE ALARM BUMPER

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of low clearance alarm devices. More particularly, the invention is concerned with an alert bumper that can be suspended adjacent a doorway and below the level of the header for activating an alarm upon being tilted in response to an impact, such as when a forklift carrying a tall load approaches the doorway.

2. Description of the Prior Art

It is not an uncommon occurrence for the driver of a forklift carrying a tall load to misjudge a low clearance such as the header of a doorway and run into the header with the load. Such an accident can have serious consequences including injury to the driver and damage to the load, header and forklift.

SUMMARY OF THE INVENTION

The present invention solves the prior art problems mentioned above and provides a distinct advance in the state of the art. In particular, the low clearance alert bumper hereof provides a warning in time to prevent impact with a low clearance structure.

The preferred alarm bumper apparatus includes a bumper, a suspension assembly for suspending the bumper at a selected height and for allowing the bumper to shift upon impact, and an alarm circuit carried by the bumper and operable for sensing impact for activating an alarm. The bumper is in the nature of a tubular member such as a pipe suspended parallel to the support surface. The alarm circuit includes a tilt switch that activates upon tilting of the bumper upon impact. In response, the circuit produces an alarm signal delivered to a pair of lamps and a speaker for providing both visual and audible alarms. Such can alert the driver of a forklift, for example, in time to prevent impact with a low clearance structure such as a doorway header. Other preferred aspects of the present invention are disclosed herein.

BRIEF DESCRIPTION OF THE DRAWINGS

FIG. 2 is a partial, exploded, pictorial view of the apparatus of FIG. 1;

FIG. 3 is a pictorial view of the preferred alarm housing and alarm circuit of the apparatus of FIG. 1 showing the housing cover positioned above the housing;

FIG. 4 is a partial top plan view of the apparatus of FIG. 1 of another embodiment of the alarm circuit switch;

DETAILED DESCRIPTION OF THE PREFERRED EMBODIMENT

Figure 1:
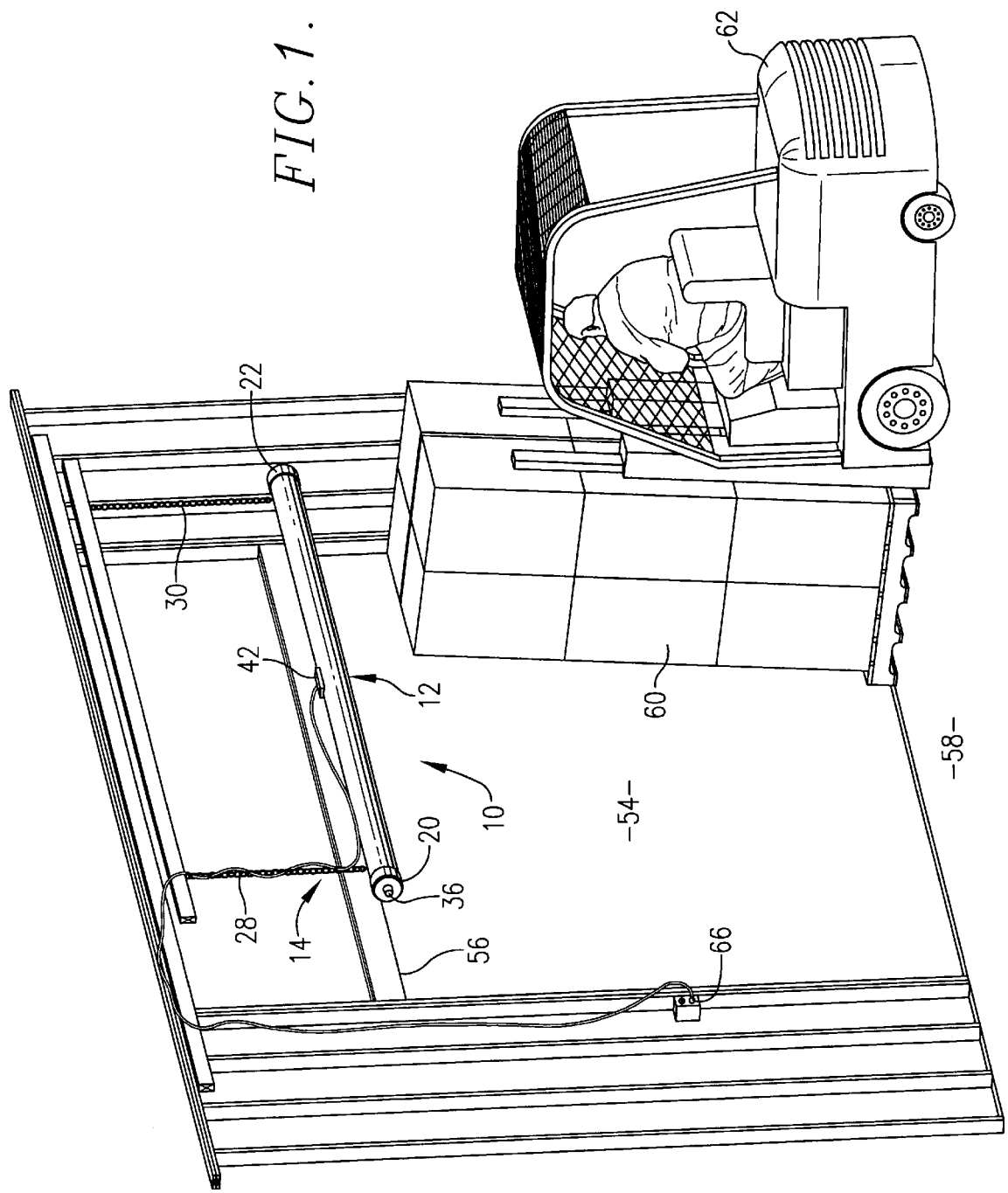
FIG. 1 is a pictorial view illustrating the preferred alarm bumper apparatus in accordance with the invention in use.

The drawing figures illustrate preferred alarm bumper apparatus 10 in accordance with the present invention. Referring in particular to FIGS. 2 and 3, apparatus 10 broadly includes bumper 12, suspension assembly 14 and alarm circuit 16.

Bumper 12 includes tubular body 18, left end cap 20 and right end cap 22. Body 18 is preferably in the nature of four inch PVC pipe about ten feet long although the diameter and length can be selected as needed for particular circumstances. End caps 20, 22 are also in the nature of PVC pipe fittings. With this material, bumper 12 is light weight, economical and easy to work.

Suspension assembly 14 includes left and right, eyelet fasteners 24 and 26 and left and right flexible cords 28 and 30. Fasteners 24, 26 are preferably in the nature of conventional eye bolts coupled with bumper 12 adjacent the respective ends thereof. Cords 28, 30 are preferably made of chain with one end of each coupled respectively with fasteners 24, 26.

Figure 5:
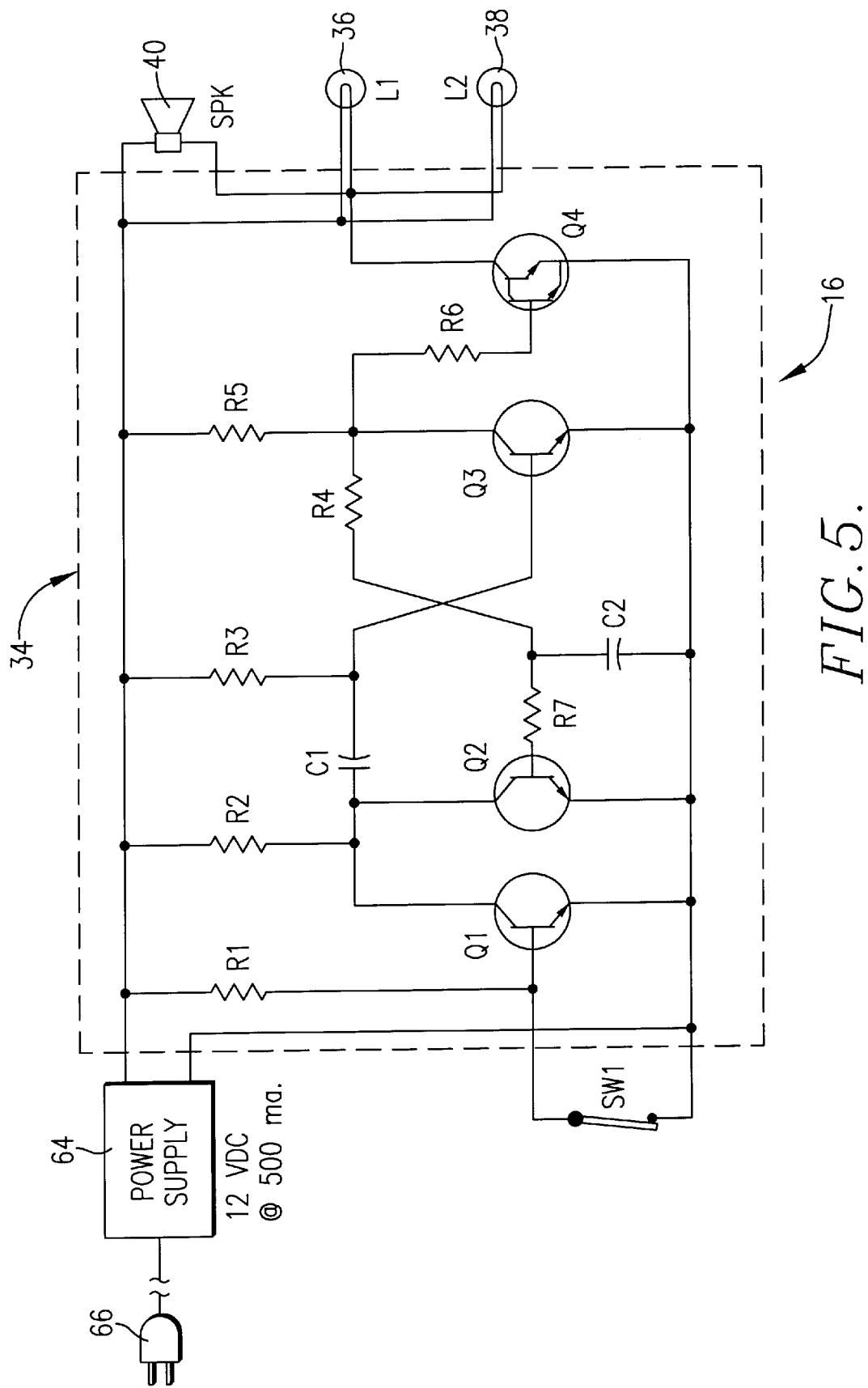
FIG. 5 is an electrical diagram of the alarm circuit of the apparatus of FIG. 1.

Referring also to FIG. 5, alarm circuit 16 includes impact switch 32, control circuit 34, left lamp 36, right lamp 38 and speaker 40. Housing 42 encloses switch 32, circuit 34 and speaker 40 under removable cover 44. As illustrated in the drawing figures, housing 42 is positioned in opening 46 defined in the upper surface of bumper 12. In the preferred embodiment, housing 42 and the components thereof are positioned within bumper 12 for greater protection against potential impact and to improve the aesthetic appearance of bumper 12.

Impact switch 32 is preferably in the nature of a normally closed, tilt switch. That is, in the static position of bumper 12 as illustrated in FIG. 1 and by the phantom lines in FIG. 6, switch 32 is in the closed position. Upon the tilting of bumper 12, indicative of impact, switch 32 is activated to open thereby indicating an alarm condition.

As will be appreciated, switch 32 can include other types of switches such as those responsive to motion and impact. FIG. 4 illustrates another example in which switch 32 is in the nature of a photoelectric switch 48 positioned adjacent one end of bumper 12 and outboard thereof. Light emitter 50 such as a low power laser is positioned adjacent the opposed end of bumper 12 and outboard thereof and oriented to emit light beam 52 for impingement on switch 48. Switch 48 is activated upon the breaking of beam 52, such indicating that bumper 12 has experienced an impact. Also, alarm circuit 16 can include more than one switch or more than one type of switch.

Control circuit 34 is coupled with switch 32 and responsive to activation thereof for producing an alarm signal. This alarm signal is in the nature of a power signal to lamps 36, 38 and speaker 40 in order to energize these components.

As best shown in FIG. 2, lamps 36, 38 are coupled with left and right end caps 20, 22 respectively. In the preferred embodiment, lamps 36, 38 include a standard amber globe and flash upon activation. Speaker 40 emits a loud, siren-like audible alarm in order to elicit an immediate response upon activation.

Figure 6:
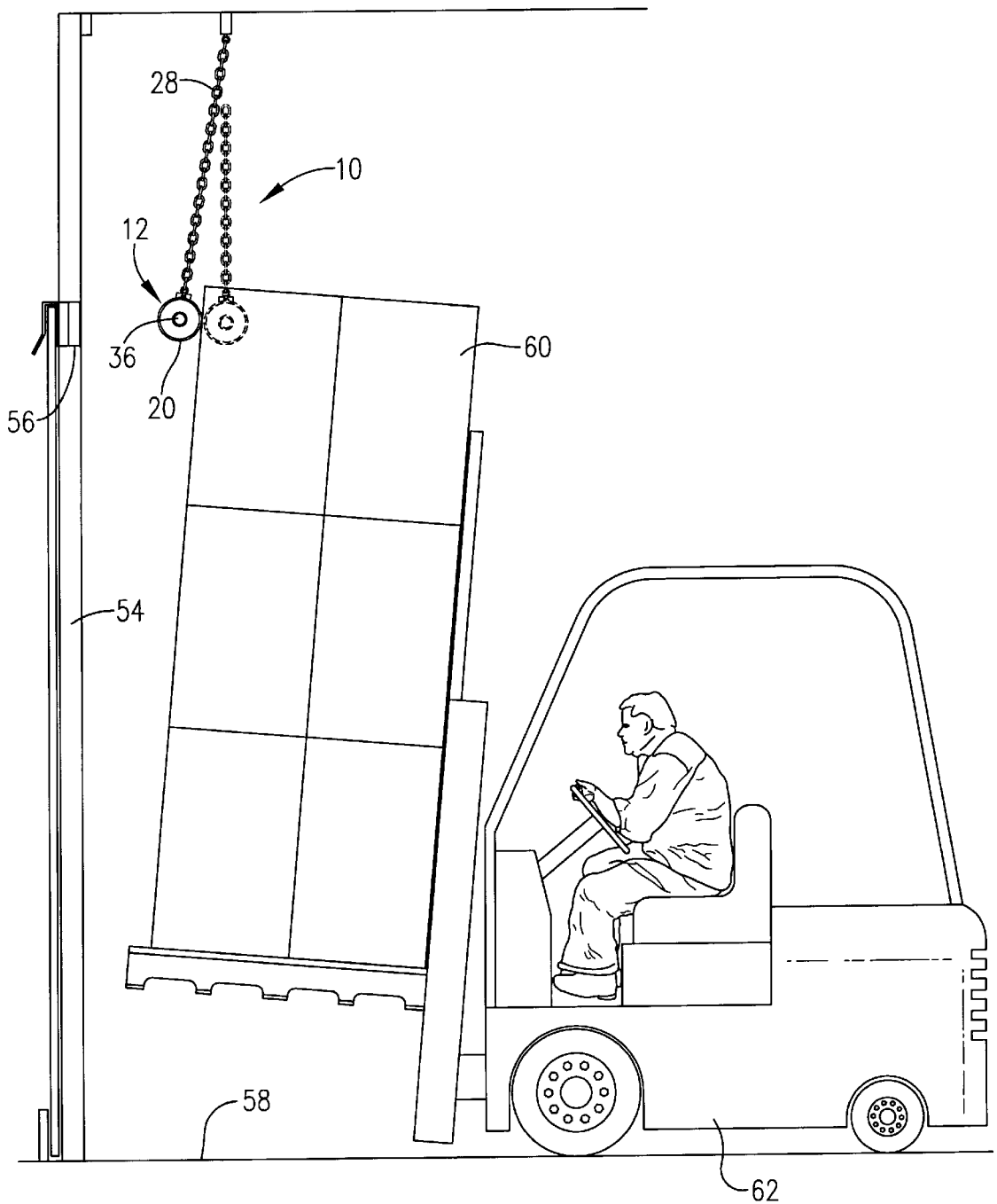
FIG. 6 is a left side elevational view of the apparatus of FIG. 1 shown in use in the tilted position by impact and with the static position shown in phantom lines.

FIGS. 1 and 6 illustrate apparatus 10 in use in a building such as a warehouse adjacent doorway 54 having header 56. Cords 28 suspend bumper 12 with the long axis thereof parallel to floor 58. Bumper 12 is preferably positioned with the lower edge thereof at the same height as the lower edge of header 56 or slightly below, and spaced horizontally about four feet from header 56. The spacing of the lower edge of bumper 12 and the spacing from header 56 is a matter of choice depending upon particular circumstances. Also, header 56 is merely an example of a low clearance area.

FIG. 6 illustrates an environment of use for apparatus 10 in which load 60 being carried by forklift 62 is too tall to fit under header 56. As load 60 approaches doorway 54, it engages bumper 12 and shifts bumper 12 from the static position (phantom lines) to the tilted position. When this occurs, switch 48 is activated and control circuit 34 responds by activating lamps 36, 38 and speaker 40. The lights and sound alert the driver of forklift 62 that impact with header 56 is imminent. That is, the driver is warned in sufficient time to stop forklift 62 to avoid a collision between load 60 and header 56.

In more detail, and referring to FIG. 5, alarm circuit 16 includes conventional 120VAC/12VDC power supply 64 having plug 66 for plugging into a convenient source of power in order to supply power at 12VDC to alarm circuit 16 including control circuit 34. Switch 32 is normally closed with bumper 12 in the static position. With switch 32 closed, transistor Q1 is off because base current by way of resistor R1 (22K) is diverted to ground.

Transistor Q3 is on because of the base current supplied by way of resistor R3 (22K). With Q3 conducting, transistors Q2 and Q4 are off. As a result, lamps 36, 38 and speaker 40 are off. Also, capacitor C1 (470 uF) is charged through resistor R2 (2.2K).

If bumper 12 receives an impact such that it tilts, then switch 32 opens and base current is supplied to transistor Q1 which begins conducting through resistor R2. When this occurs, capacitor C1 begins to discharge through Q1. This reverse biases Q3 which turns off.

With Q3 off, the voltage at the collector thereof begins to rise through resistor R5 (2.2K). However, capacitor C2 (22 uF) limits this rise through resistor R4 (15K) for about three milliseconds. If switch 32 again closes during this delay time, Q2 and Q4 remain off, Q1 turns off and Q3 resumes conducting. In this way, transients or momentary operation of switch 32 do not trigger activation of lamps 36, 38 and speaker 40.

If switch 32 remains open more than 3 ms, capacitor C2 charges to the supply voltage level. Base current is supplied by way of resistor R7 (15K) to transistor Q2 and by way of resistor R6 (22K) to transistor Q4. Operation of Q4 activates lamps 36, 38 and speaker 40.

With transistor Q2 on, the left side of capacitor C1 is clamped to ground in parallel with Q1. Even if switch 32 recloses, Q2 remains conducting. Also, Q3 remains off until capacitor C1 charges through resistor R3. This takes about eight seconds. At this time, Q3 turns on and the circuit resets. Thus, once an alarm is triggered, lamps 36, 38 and speaker 40 remain energized for eight seconds even if switch 32 recloses, and turn off at the end of eight seconds even if switch 32 is still open.

Those skilled in the art will appreciate that the present invention encompasses many variations in the preferred embodiments described herein. Having thus described these embodiments, the following is claimed as new and desired to be secured by Letters Patent:

What is claimed is:

1. An alarm bumper apparatus comprising:

a bumper;

a suspension assembly configured for suspending said bumper at a selected height above a support surface and for allowing said bumper to shift upon impact; and an alarm circuit carried by said bumper and operable for sensing impact by said bumper and responsive thereto for activating an alarm, said alarm circuit including a switch and activatable in response to shifting of said bumper and including a control circuit coupled with said switch and responsive to activation thereof for producing an alarm signal, said switch including a light responsive switch, said alarm circuit further including a light beam emitting device carried by said bumper, spaced from said switch and positioned for directing said light beam onto said switch, said switch being activatable in response to interruption of said light beam, such being indicative of said bumper receiving an impact and shifting as a result;

Wherein said alarm circuit further including a pair of lamps carried by said bumper, said lamps illuminating in response to said alarm signal, and a sound emitting device responsive to said alarm signal for producing an audible alarm, and a timing structure for stopping said alarm signal after a predetermined time.

2. An alarm bumper apparatus comprising:

a bumper;

a suspension assembly configured for suspending said bumper at a selected height above a support surface and for allowing said bumper to shift upon impact; and an alarm circuit carried by said bumper and operable for sensing impact by said bumper and responsive thereto for activating an alarm, said bumper being configured to present a longitudinal axis and opposed ends, said suspension assembly being configured for orienting said bumper with said axis substantially parallel to a support surface, said alarm circuit including a switch activatable in response to shifting of said bumper, a control circuit responsive to activation of said switch for producing an alarm signal, and at least one lamp operable for illuminating a response to said alarm signal, said alarm circuit including a pair of said lamps respectively positioned at said opposed ends of said bumper;

wherein said switch including a light responsive switch, said alarm circuit further including a light beam emitting device carried by said bumper, spaced from said switch and positioned for directing said light beam onto said switch, said switch being activatable in response to interruption of said light beam, such being indicative of said bumper receiving an impact and shifting as a result;

wherein said alarm circuit further including a sound emitting device responsive to said alarm signal for providing an audible alarm, and said alarm circuit being operable for stopping said alarm signal after a predetermined time.

* * * * *